(No Model.)
P. FOURNIER.
TREADLE.
No. 431,342.  Patented July 1, 1890.
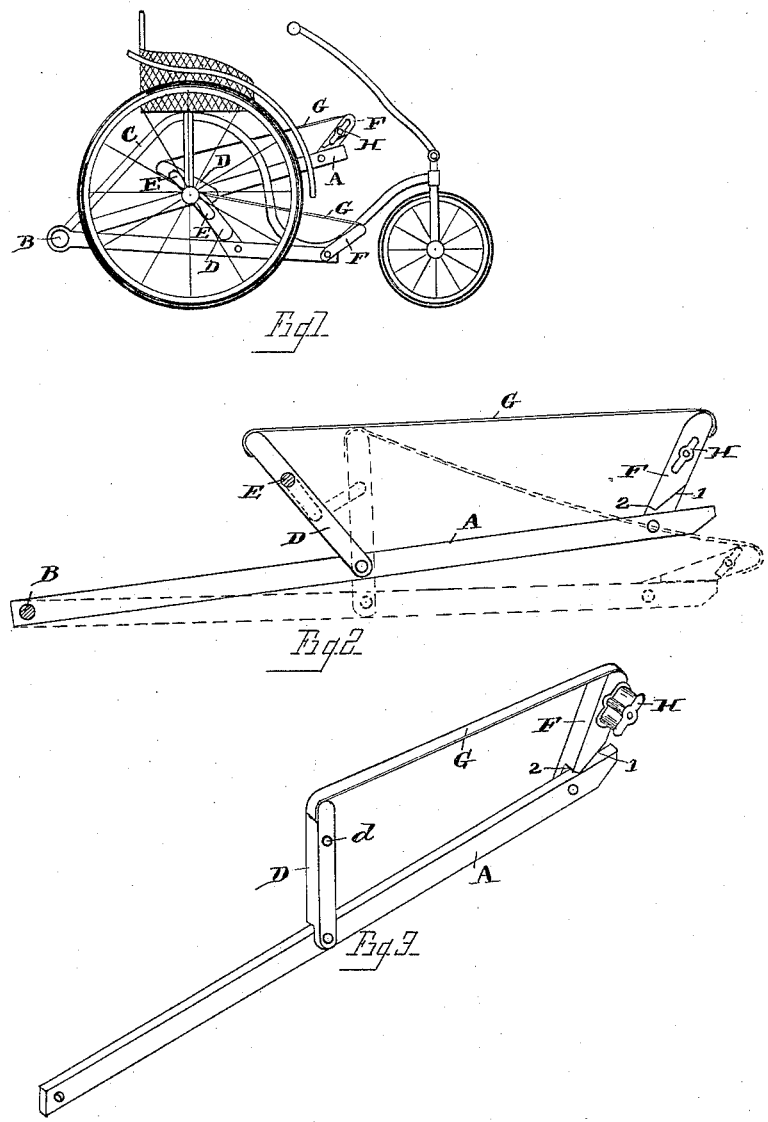

UNITED STATES PATENT OFFICE.

PHILANDRE FOURNIER, OF TOLEDO, OHIO, ASSIGNOR TO MAGLOIR DE MARS, OF SAME PLACE.

TREADLE.

SPECIFICATION forming part of Letters Patent No. 431,342, dated July 1, 1890.

Application filed April 2, 1890. Serial No. 346,286. (No model.)

*To all whom it may concern:*

Be it known that I, PHILANDRE FOURNIER, of Toledo, in the county of Lucas and State of Ohio, have invented certain new and useful Improvements in Treadles; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to an improvement in treadles; and it has for its object the production of an easily-operated treadle well adapted for use with velocipedes, tricycles, &c., and also with some kinds of machinery, as will be apparent.

The invention will first be described in connection with the accompanying drawings, and then pointed out in the claims.

Figure 1 of the drawings is a side elevation of my improved treadle applied to a child's velocipede, one of the wheels of the vehicle being omitted, the treadle in this instance being composed of two similar sections. Fig. 2 is a side elevation of the treadle, showing in dotted lines the various positions assumed by its parts while in operation. Fig. 3 is a perspective view of the treadle.

A represents a horizontal lever, pivoted at one end on any suitable support B, which in the instance represented in Fig. 1 is a rod passed through the rear end of the reach C of the velocipede.

To the lever A, about mid-length, there is pivoted a rear vertical lever D, whose pivotal point is at its lower end. In this lever D, above the central portion, there is found a bearing *d* for the journal of a cranked axle E, in this instance the bearing being simply a perforation, as shown. To the forward end of the horizontal lever A there is pivoted another (the front) vertical lever F, which is connected with lever D by means of a leather strap G or other suitable flexible device attached to the upper ends of both of said levers, and in order to limit the inclinations of this lever F it has formed upon its lower portion, immediately above the horizontal lever A, an oblique shoulder 1 and a straight shoulder 2, the former to limit the forward inclination and the latter to limit the rearward inclination.

H represents a pedal journaled upon lever F, preferably above its center.

It will be understood from the above description that the horizontal lever A is of the second order, that the vertical lever D is also of the second order, and that the vertical lever F is of the third order, the flexible connection G representing weight on lever F and power on lever D. By this combination of levers I obtain a double action upon lever D, in which the cranked axle is journaled, for, as the operator presses down upon the pedal with his foot, lever F is given a forward inclination, tending to draw the free end of lever D forward, and thereby turning the cranked axle, and while pressure is being exerted upon the pedal the forward end of lever A will be depressed, thus drawing lever D downward and materially assisting in the turning of the axle.

When my improved treadle is to be used with vehicles, as shown in Fig. 1 of the drawings, in which there is a double-cranked axle, it is made double, or of two similar sections; but when it is to be used with machinery in which there is a fly-wheel a single section may form the complete treadle, and therefore it is immaterial, as concerns the scope of my invention, whether a single or a double treadle be used, as the gist of the invention resides in the peculiar combination and arrangement of the levers and their connections.

Having thus described my invention, what I claim as new, and desire to secure by Letters Patent, is—

1. A treadle comprising a horizontal lever pivoted at one end to a fixed support, a rear vertical lever pivoted at its lower end to the horizontal lever and having an axle-bearing, a front vertical lever pivoted to the horizontal lever and provided with a journaled pedal, and a flexible strap connecting the upper ends of the two vertical levers, all substantially as described, and for the purpose set forth.

2. In a treadle mechanism, a crank-shaft, a pedal-lever, and compound levers connected with the crank-shaft and with the pedal-lever by means of a leather strap or other like flexible connection, as and for the purpose set forth.

In testimony that I claim the foregoing as my own I hereby affix my signature in presence of two witnesses.

PHILANDRE FOURNIER.

Witnesses:
WILLIAM WEBSTER,
THEODORE C. MUNZ.